(12) United States Patent
Park et al.

(10) Patent No.: US 7,835,333 B2
(45) Date of Patent: Nov. 16, 2010

(54) METHOD OF REFINING NODE POSITION INFORMATION IN WIRELESS SENSOR NETWORK

(75) Inventors: Jong-hun Park, Yongin-si (KR); Min-seop Jeong, Yongin-si (KR); Woo-jong Park, Yongin-si (KR); Min-Q Kim, Yongin-si (KR); Daeyoung Kim, Seoul (KR); Seongeun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 11/651,068

(22) Filed: Jan. 9, 2007

(65) Prior Publication Data

US 2007/0159986 A1    Jul. 12, 2007

(30) Foreign Application Priority Data

Jan. 9, 2006    (KR) ............... 10-2006-0002453

(51) Int. Cl.
*H04W 4/00* (2009.01)
(52) U.S. Cl. .............. 370/338; 370/328; 455/440; 455/456.1; 709/223
(58) Field of Classification Search .......... 370/338, 370/235, 328, 254, 351; 455/404.2, 414.2, 455/440, 456.1, 456.5, 457
See application file for complete search history.

(56) References Cited

U.S. PATENT DOCUMENTS

| | | | | |
|---|---|---|---|---|
| 5,245,609 A | * | 9/1993 | Ofek et al. | 370/235 |
| 6,349,091 B1 | * | 2/2002 | Li | 370/238 |
| 7,457,860 B2 | * | 11/2008 | Shang et al. | 709/223 |
| 2005/0090266 A1 | * | 4/2005 | Sheynblat | 455/456.1 |
| 2005/0107946 A1 | * | 5/2005 | Shimizu et al. | 701/207 |
| 2005/0233748 A1 | * | 10/2005 | Robinson et al. | 455/440 |
| 2007/0153720 A1 | * | 7/2007 | Baglin et al. | 370/328 |

FOREIGN PATENT DOCUMENTS

KR    10-2005-0046701 A    5/2005

\* cited by examiner

*Primary Examiner*—Kent Chang
*Assistant Examiner*—Dinh P Nguyen
(74) *Attorney, Agent, or Firm*—Sughrue Mion, PLLC

(57) ABSTRACT

Provided is a method for refining node position information in a wireless sensor network having an ultra wideband communication network and a wireless personal area network where the initial positions of respective nodes are set, by utilizing nodes at a 2-hop distance, or more than a 2-hop distance when the number of neighboring nodes at a 1-hop distance is not sufficient to perform triangulation, and to refine the position of nodes based on a distance measured between the respective nodes. Because the initial position is refined and confirmed in a wireless sensor network, a user node operates as a pseudo anchor node for the nodes which have no anchor node nearby. Furthermore, as a node has the refined position, it can act as a pseudo anchor node and be used to compute the position of the other nodes. Additionally, positions of nodes of the wireless sensor network can be estimated with more accuracy.

8 Claims, 3 Drawing Sheets

(a): ACTUAL POSITION
(b): INITIAL POSITION
(c): REFINED POSITION

METHOD OF REFINING NODE POSITION INFORMATION IN WIRELESS SENSOR NETWORK

CROSS-REFERENCE TO RELATED APPLICATIONS

This application claims priority from Korean Patent Application No. 10-2006-0002453, filed Jan. 9, 2006, in the Korean Intellectual Property Office, the entire disclosure of which is hereby incorporated by reference.

BACKGROUND OF THE INVENTION

1. Field of the Invention

Methods consistent with the present invention relate to refining of node position information in a wireless sensor network. More specifically, in a wireless sensor network having an ultra wideband communication network and a wireless personal area network where the initial positions of respective nodes are set, the present invention relates to a method of refining node position information to refine the position of nodes based on a distance measured between the respective nodes, utilizing nodes at a 2-hop distance, or more than a 2-hop distance, when the number of 1-hop neighboring nodes is not sufficient to perform triangulation.

2. Description of the Related Art

There are generally three ways of position estimating in a multi-hop wireless sensor network or a wireless personal area network.

Among the three general ways of position estimating, the first one estimates distance between an anchor node and an unknown node at a multi-hop distance according to the measured inter-hop distance, and then estimates the position of the unknown node using range-based position estimating such as sum-dist. The first method provides advantages such as low estimation error in an environment where there is a low possibility of a distance measuring error. However, this method has a drawback that it is heavily dependent on the accuracy of distance measurement.

The second method for position estimating is a range-free estimation, which estimates distance between an anchor node and an unknown node using computed distance instead of measured distance, and then estimates the position of the unknown node. This second method provides the advantage that the accuracy of position estimating is hardly influenced by distance measurement errors. However, it is hard to find an accurate position of the node.

The third way of position estimating is to use advantageous features of the above two methods, and this is a multi-modal method such as Parametric Learning-based Distance Location (Para-LDL). The Para-LDL method can provide far better performance than the other estimating methods, but still has the problem of a distance measurement error which is generated as the unknown node is at a multi-hop distance from the anchor node in a multi-hop sensor network.

SUMMARY OF THE INVENTION

It is an aspect of the present invention to resolve the above-mentioned problems occurring in the related art. Therefore, an aspect of the present invention is to provide a method of refining node position information which, in a wireless sensor network having an ultra wideband communication network and a wireless personal area network where the initial positions of respective nodes are set, refines node position information with utilizing nodes at a 2-hop distance, or more than a 2-hop distance, when the number of 1-hop neighboring nodes is not sufficient to perform triangulation, to refine the position of nodes based on a distance measured between the respective nodes.

According to an aspect of the present invention, there is provided a method of refining a node position information in a wireless sensor network, comprising: setting an initial position based on an anchor node; receiving a position refining message from the anchor node; refining the initial position by measuring a distance to neighboring nodes based on the anchor node; and notifying the refined position, by switching into a pseudo anchor node based on a refined position information, and broadcasting the refined position information and a pseudo anchor information to the other nodes.

In the receiving of the position refining message, the position refining message broadcast from the anchor node is received.

In the setting of the initial position, the initial position is refined using three anchor nodes, including anchor nodes within a 2-hop distance, or more than a two-hop distance, when three anchor nodes do not exist among the neighboring nodes in a 1-hop distance.

In the setting of the initial position, the other nodes set a standby time and count the standby time while the initial position is refined.

The other nodes cancel the standby time and perform refining of the next node that has three or more anchor nodes including the pseudo anchor node within a 1-hop distance as its neighboring nodes, when the nodes receive the refined position information.

In the notifying of the refined position, the anchor node learns a coefficient of a distance function using other anchor nodes and the pseudo anchor node, and a node newly entering the network utilizes the learned coefficient of the distance function which is provided from the anchor node, in setting its position.

In the notifying of the refined position, the other nodes, on receiving the refined position information and the pseudo anchor information, use one or more anchor node at a multi-hop distance, when there are less than three anchor nodes within a 1-hop distance. The anchor node at a less number of multi-hops has a priority.

In the receiving of the position refining message, the position refining message is transmitted to the anchor node to start the refining of the initial position, when the set initial position is changed by more than a predetermined distance.

BRIEF DESCRIPTION OF THE DRAWING FIGURES

These and/or other aspects, features, and advantages of the present general inventive concept will become apparent and more readily appreciated from the following description of the embodiments, taken in conjunction with the accompanying drawings of which:

DETAILED DESCRIPTION OF EXEMPLARY EMBODIMENTS

Figure 1:
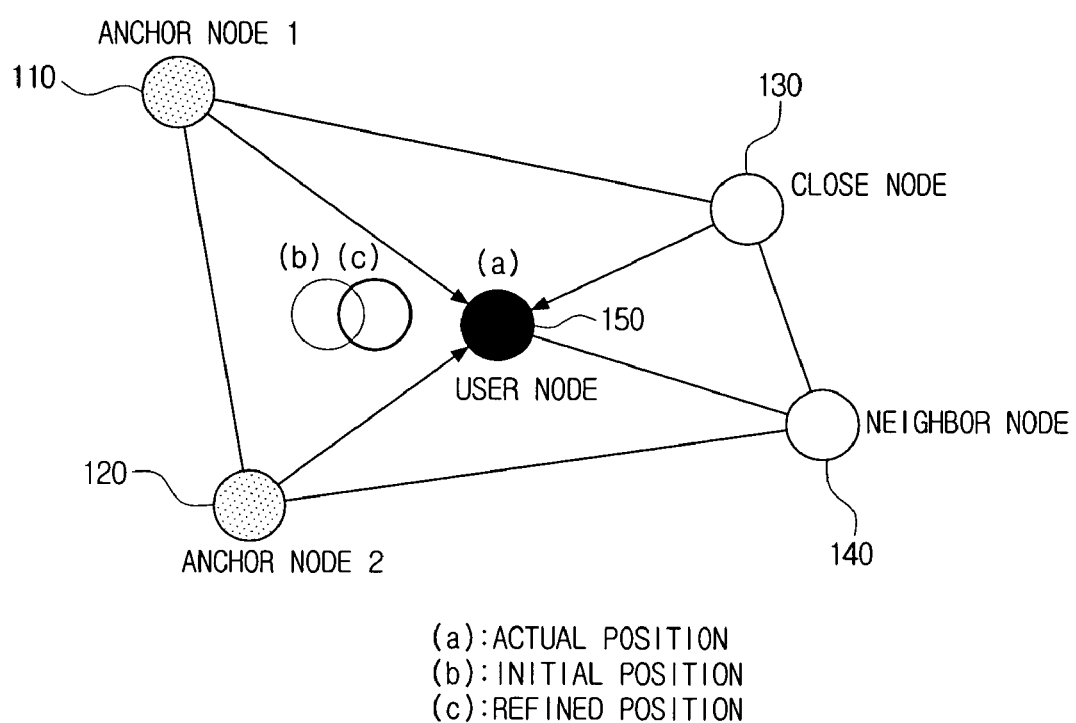
FIG. 1 is a diagram illustrating a wireless sensor network to explain a method of refining node position information according to an exemplary embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a diagram illustrating a wireless sensor network to explain a method of refining node position information according to an exemplary embodiment of the present invention.

The wireless sensor network according to an exemplary embodiment of the present invention includes an anchor node 110, 120, a close node 130, a neighbor node 140 and a user node 150. In addition, the wireless sensor network may include a plurality of nodes at a 2-hop distance, or more than the 2-hop distance, from the user node 150.

The respective nodes of the wireless sensor network measure distance to one another using Zigbee™ communications, and collect the distance information and determine positions of the other nodes using localization algorithm.

Three of the network nodes must know their absolute positions, to compute the absolute positions of the other nodes. The nodes knowing their absolute positions are known as the 'anchor nodes'.

As the respective nodes set their initial positions, the anchor nodes 110, 120 broadcast position refine message to the respective nodes.

The close node 130 is closest to the user node 150, and the neighbor nodes 140 are second-closest to the user node 150.

When receiving a position refine message from the anchor nodes 110, 120, the user node 150 measures distance to the respective nodes at a 1-hop distance, including the anchor nodes 110, 120.

When there is no anchor node 110, 120 within a 1 through 3-hop distance, the user node 150 refines its initial position by using the anchor node 110, 120 at a 2-hop distance, or more than a 2-hop distance. As its position is confirmed upon completing the position refining, the user node 150 changes to a pseudo anchor node and broadcasts its new position information and the pseudo anchor information to the other nodes.

The method of refining node position information according to an exemplary embodiment of the present invention will be explained below, with reference to FIGS. 1, 2 and 3.

First, the user node 150 between the first and the second anchor nodes 110, 120, the close node 130 and the neighbor node 140 sets its initial position.

Figure 2:
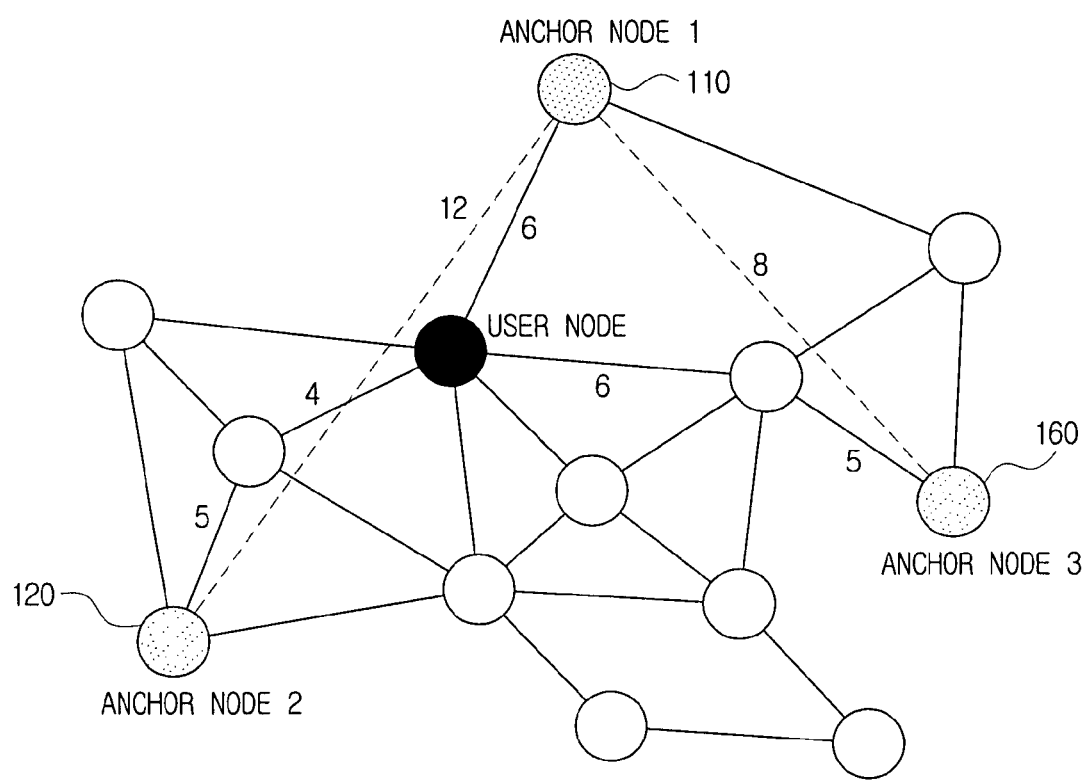
FIG. 2 is a diagram illustrating a wireless sensor network setting initial positions according to a method of refining node position information of an exemplary embodiment of the present invention.

Referring to FIG. 1, the user node 150 in the current position (a) sets its initial position (b) as shown in FIG. 2.

The user node 150 measures distance to at least three anchor nodes generally using three ways as explained below.

First, the user node 150 may use a range-based localization such as "Sum-Dist", which adds distances between hops to the anchor node. Referring to FIG. 2, hop distance between the user node 150 and the second anchor node 120 is "5+4", and thus it is "9". The hop distance between the user node 150 and the first anchor node 110 is "6", and the hop distance between the user node 150 and the third anchor node 160 is "6+5", which is "11".

Second, the user node 150 may use a range-free localization such as "DV-Hop" to measure distance to an anchor mode, which multiplies the number of hops to the anchor node by the average hop distance. Referring to FIG. 2, the distance between the first and the second anchor nodes 110, 120 is three hops and "12", and the distance between the first anchor node 110 and the third anchor node 160 is two hops and "8". Accordingly, the average hop distance is "4". Because there are two hops between the user node 150 and the second anchor node 120, the distance is "8", i.e., the number of hops between the user node 150 and the second anchor node 120 ("2") multiplied by the average hop distance ("4"). There is one hop between the user node 150 and the first anchor node 110, therefore the distance is "4". There are two hops between the user node 150 and the third anchor node 160, hence the distance is "8".

Third, the user node 150 may use a multimodal localization such as "Para-LDL", which uses a distance function indicating inter-node distance. The distance function may use the following:

$$d = w_0 * snh + w_1$$

$$d = w_0 * ssd + w_1$$

$$d = w_0 * ssd + w_1 * snh + w_2 \quad \text{[Mathematical expressions 1]}$$

where, 'ssd' denotes the sum of distances and "snh" denotes the sum of hops of the shortest path. The coefficients $w_0 \sim w_2$ of the distance function are acquired by learning. With $w_0=0.9$, $w_1=0.1$, and $w_2=0.5$, the distance between the user node 150 and the second anchor node 120 is "0.9*(5+4)+0.1*2+0.5=8.8", and the distance between the user node 150 and the third anchor node 160 is "0.9*(6+5)+0.1*2+0.5=10.6".

The user node 150 obtains the initial position (b) of FIG. 1 as explained above.

Figure 3:
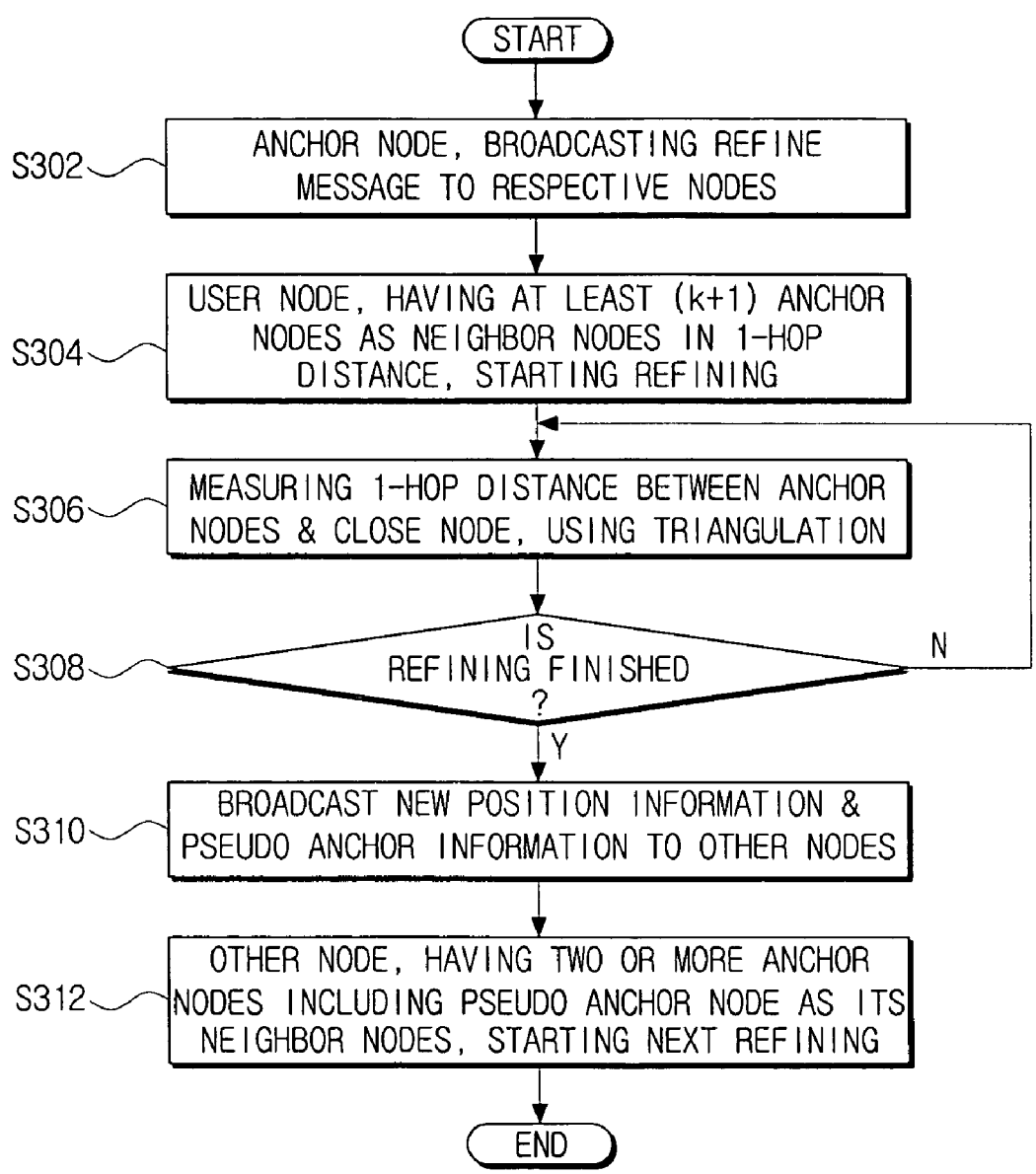
FIG. 3 is a flowchart illustrating a method of refining node position information according to an exemplary embodiment of the present invention.

When the user node 150 sets the initial position (b), the anchor nodes 110, 120, and 160 broadcast a position refining message to the respective nodes to confirm the initial positions (S302) as shown in FIG. 3. When the user node 150, having set the initial position, moves by more than a predetermined distance, the user node 150, rather than receiving the position refining message from the anchor node 110, 120, transmits the position refining message to the anchor node 110, 120 to proceed to the refining of the initial position.

When the wireless sensor network is in 'k' dimension, among the nodes including the user node 150 which receive position refining message from the anchor node 110, 120, the user node 150, which has at least (k+1) anchor nodes as its 1-hop neighbor nodes, starts the position refining (S304).

With reference to FIG. 2, when the first and the second anchor nodes 110, 120 are within 1-hop distance, and the third anchor node is at 2-hop, or more than 2-hop distance, the user node 150 refines the initial position, using the third anchor node 160, and the first and the second anchor nodes 110, 120.

In operation S306, the user node 150 measures 1-hop distance between the anchor nodes and the close node using the triangulation based on the first through the third anchor nodes. The user node 150 may use the distance function as follows:

$$\begin{bmatrix} d_1^* \\ \vdots \\ d_j^* \end{bmatrix} = \begin{bmatrix} x_{11} & x_{21} & 1 \\ \vdots & \vdots & \vdots \\ x_{1j} & x_{2j} & 1 \end{bmatrix} \begin{bmatrix} w_0 \\ w_1 \\ w_2 \end{bmatrix} \quad \text{[Mathematical expression 2]}$$

When the user node 150 finishes refining the current position as explained above (S308), the user node 150 acquires refined position information as position (c) in FIG. 1.

Because the user node 150 has accurate refined position information from at least (k+1) anchor nodes in 'k' dimension, the user node 150 may act as a pseudo anchor node.

While the user node 150 performs refining of the initial position, the other nodes including the close node 130 and the neighbor node 140 set a standby time and count the time while waiting during the standby time.

When finishing the refining of the initial position, the user node 150 broadcasts the new position information, including the refined position information and the pseudo anchor information, to the other nodes including the close node 130 and the neighbor node 140, to notify of the refined position information and the fact that the user node 150 is acting as the pseudo anchor node (S310).

The other nodes stop counting the standby time when they receive the refined position information and the pseudo anchor information from the user node 150, and another node, that has three anchor nodes, including the pseudo anchor node, within 1-hop distance, becomes the next priority.

When the nodes within 1-hop distance to the user node 150 have less than 3 anchor nodes within 1-hop distance, another node that has three anchor nodes, including anchor nodes distanced two or more hops away, has the next turn for the position refining.

Accordingly, a node having two or more anchor nodes, including the pseudo node as its neighbor nodes, starts the next refining process (S312).

Meanwhile, the anchor node obtains accurate distance function by learning, using the other anchor nodes and the pseudo anchor node. Accordingly, when a new node is added to the wireless sensor network, the anchor node provides the newly-entering node with the distance function as follows:

$$\begin{bmatrix} d_1^* \\ \vdots \\ d_j^* \\ d_{j+1}^* \\ \vdots \\ d_{j+p}^* \end{bmatrix} = \begin{bmatrix} x_{11} & x_{21} & 1 \\ \vdots & \vdots & \vdots \\ x_{1j} & x_{2j} & \vdots \\ x_{1j+1} & x_{2j+1} & \vdots \\ \vdots & \vdots & \vdots \\ x_{1j+p} & x_{2j+p} & 1 \end{bmatrix} \begin{bmatrix} w_0 \\ w_1 \\ w_2 \end{bmatrix} \quad \text{[Mathematical expression 3]}$$

Accordingly, the node newly entering the network utilizes the newly-learned distance function which is provided from the anchor node, to set its position in the network. The newly-learned distance function has the matrix as shown in expression 3, which is added with $d^*_{j+1}$ through $d^*_{j+p}$.

The nodes receiving the refined position information and the pseudo anchor information from the user node 150, use the anchor node at a multi-hop distance, when there is less than three anchor nodes within 1-hop distance. The nodes use the anchor nodes in the order of the least number of multi-hops between the nodes and the anchor node.

As explained above, because the initial position is refined and confirmed in a wireless sensor network, a user node operates as a pseudo anchor node for the nodes which have no anchor node nearby. Furthermore, as a node has the refined position, it can act as a pseudo anchor node and be used in the computation of position of the other nodes. Additionally, positions of nodes of the wireless sensor network can be estimated with more accuracy.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of refining a node position information in a wireless sensor network, comprising:

setting, by a first node, an initial position based on a first anchor node;

receiving a position refining message from the first anchor node;

refining the initial position by measuring a distance to neighboring nodes based on the first anchor node; and notifying the refined position, by switching into a pseudo anchor node based on the refined position information, and broadcasting the refined position information and a pseudo anchor information to the neighboring nodes to notify that the first node is acting as a pseudo anchor node, wherein in the setting of the initial position, the initial position is refined using three other anchor nodes, including anchor nodes within a two-hop distance, or more than the two-hop distance, when the three other anchor nodes do not exist among the neighboring nodes within a 1-hop distance, and wherein the first anchor node obtains a distance function by learning, using the three other anchor nodes and the pseudo anchor node, and the anchor node provides a newly-entering node with the distance function.

2. The method of claim 1, wherein in the receiving of the position refining message, the position refining message, which is broadcast from the first anchor node, is received.

3. The method of claim 1, wherein in the setting of the initial position, the neighboring nodes set a standby time and count the standby time while waiting for the initial position to be refined.

4. The method of claim 3, wherein the neighboring nodes cancel the standby time and perform refining of a next node that has three or more anchor nodes including the pseudo anchor node within a 1-hop distance as its neighboring nodes, when the neighboring nodes receive the refined position information.

5. The method of claim 1, wherein in the notifying of the refined position, the first anchor node learns a coefficient of a distance function using the three other anchor nodes and the pseudo anchor node, and the node newly entering the wireless sensor network utilizes the learned coefficient of the distance function which is provided from the first anchor node, in setting its position.

6. The method of claim 1, wherein in the notifying of the refined position, the neighboring nodes, on receiving the refined position information and the pseudo anchor information, use one or more anchor nodes at a multi-hop distance, when there are less than three anchor nodes within a 1-hop distance.

7. The method of claim 6, wherein the first anchor node that is a less number of multi-hops away from the neighboring nodes has a priority.

8. The method of claim 1, wherein in the receiving of the position refining message, the position refining message is transmitted to the first anchor node to start the refining of the initial position, when the set initial position is changed by more than a predetermined distance.

* * * * *